United States Patent
Lam (10) Patent No.: US 9,514,033 B2
(45) Date of Patent: Dec. 6, 2016

(54) SYSTEMS AND METHODS FOR PROCESSING SOFTWARE APPLICATION METADATA ASSOCIATED WITH A SOFTWARE APPLICATION

(71) Applicant: Vu Lam, Dublin, CA (US)

(72) Inventor: Vu Lam, Dublin, CA (US)

(*) Notice: Subject to any disclaimer, the term of this patent is extended or adjusted under 35 U.S.C. 154(b) by 0 days.

(21) Appl. No.: 14/678,997

(22) Filed: Apr. 5, 2015

(65) Prior Publication Data

US 2015/0212929 A1  Jul. 30, 2015

Related U.S. Application Data

(63) Continuation of application No. 13/603,374, filed on Sep. 4, 2012, now Pat. No. 9,003,362.

(60) Provisional application No. 61/530,401, filed on Sep. 2, 2011.

(51) Int. Cl.
| | | |
|---|---|---|
| *G06F 17/30* | (2006.01) | |
| *G06F 9/44* | (2006.01) | |
| *G06F 9/45* | (2006.01) | |
| *G06F 11/36* | (2006.01) | |

(52) U.S. Cl.
CPC ....... *G06F 11/3664* (2013.01); *G06F 11/3672* (2013.01)

(58) Field of Classification Search
CPC .... G06F 11/3684; G06F 11/3688; G06F 9/54; G06F 8/71; G06F 8/70; G06F 8/61; G06F 11/3664; G06F 17/30241; G06F 9/4428; G06F 9/4436

See application file for complete search history.

(56) References Cited

U.S. PATENT DOCUMENTS

| | | | | |
|---|---|---|---|---|
| 6,854,089 B1* | 2/2005 | Santee | ................ | G06F 11/3688 714/E11.208 |
| 8,607,207 B2* | 12/2013 | Chamieh | ............... | G06F 9/4428 715/763 |
| 8,645,929 B2* | 2/2014 | Chamieh | ............... | G06F 9/4428 717/105 |
| 8,904,275 B2* | 12/2014 | Pilskalns | ........... | G06F 17/30241 715/230 |
| 8,983,896 B2* | 3/2015 | von Kaenel | ...... | G06F 17/30241 707/602 |
| 9,003,362 B2* | 4/2015 | Lam | .................... | G06F 11/3672 717/105 |
| 9,111,380 B2* | 8/2015 | Piemonte | .............. | G06T 15/005 |
| 2006/0095276 A1* | 5/2006 | Axelrod | ................. | G06Q 99/00 717/104 |

(Continued)

OTHER PUBLICATIONS

Russell et al., MLeXAI: A Project-Based Application-Oriented Model, Jul. 2010, 36 pages.*

*Primary Examiner* — Thuy Dao
(74) *Attorney, Agent, or Firm* — Minh N. Nguyen; Next IP Law Group LLC (57) ABSTRACT

Systems and methods for processing software application metadata associated with a software application are provided. A representative method includes the step of collecting software application metadata associated with a software application. The software application metadata includes a first set of information related at least one of the following: screens, paths, and layers associated with the software application. The method further includes the step of storing the software application metadata in a data repository.

14 Claims, 8 Drawing Sheets

(56) References Cited

U.S. PATENT DOCUMENTS

| | | | |
|---|---|---|---|
| 2007/0106975 A1* | 5/2007 | DeLine | G06F 8/34 717/106 |
| 2008/0127100 A1* | 5/2008 | O'Farrell | G06F 8/34 717/125 |
| 2011/0239195 A1* | 9/2011 | Lin | G06F 8/71 717/126 |
| 2013/0325343 A1* | 12/2013 | Blumenberg | G01C 21/00 701/533 |

* cited by examiner

SYSTEMS AND METHODS FOR PROCESSING SOFTWARE APPLICATION METADATA ASSOCIATED WITH A SOFTWARE APPLICATION

CROSS REFERENCE TO RELATED APPLICATIONS

This application is a continuation of U.S. utility application entitled, "SYSTEMS AND METHODS FOR PROCESSING SOFTWARE APPLICATION METADATA ASSOCIATED WITH A SOFTWARE APPLICATION," having Ser. No. 13/603,374, filed on Sep. 4, 2012, which claims the benefit of U.S. provisional application entitled, "APPLICATION MAP," having Ser. No. 61/530,401, filed on Sep. 2, 2011, all of which are entirely incorporated herein by reference.

TECHNICAL FIELD

The present disclosure is generally related to computer software and, more particularly, is related to systems and methods for processing software application metadata associated with a software application.

BACKGROUND

Computer and web-based software applications are becoming larger in size and more complex mainly because they can perform more functionality than their predecessors. This can result in an increase in defects that occur in the software applications. Test and quality software applications are available to aide software developers in identifying areas within software applications that have the highest rate of software defects.

Desirable in the art is a test and quality software application that would improve upon the test and quality software application.

SUMMARY

Systems and methods for processing software application metadata associated with a software application are provided. A representative method includes the step of collecting software application metadata associated with a software application. The software application metadata includes a first set of information related at least one of the following: screens, paths, and layers associated with the software application. The method further includes the step of storing the software application metadata in a data repository.

Another representative method includes the step of creating and mapping "areas" on an application map based on software application metadata collected from a software application. The software application metadata includes a first set of information related at least to one of the following: screens, paths and layers associated with the software application. The method further includes the steps of associating unique identifiers with the respective "areas" on the application map; and overlaying a second set of information of the software application metadata on top of the "areas" on the application map using the unique identifiers, respectively. The second set of information is related to various attributes of the software application.

A representative system includes a processing device and a data repository that stores an application map manager having instructions that are executed by the processing device. The application map manager includes a map builder that performs the following steps: collecting software application metadata associated with the software application, wherein the software application metadata includes a first set of information related at least one of the following: screens, paths, and layers associated with the software application; and storing the software application metadata in the data repository.

A representative application map displays a map-like visualization of a software application and aides software developers in navigating and analyzing the various software components of the software application. The application map includes areas on the application map that include screens; area layers that group at least one area on the application map; paths that link the areas on the application map to another area to show progression of the software application from one area to another; and data layers that show information that are related to quality assurance of the features, functionalities, and attributes of the software application.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which software application metadata associated with a software application is processed and an application map is provided.

In general, application map is a technology that enables a map-like visualization of a software application. It also provides tracking modules that obtain quality-related information from the analysis of the software applications. The quality-related information is generally data that are related to quality assurance of the features, attributes, and functionalities of the software applications. The quality-related information can be overlaid on top of the map-like visualization of screens associated with quality assurance of the software applications. The application map can be applied to a variety of software applications including, but not limited to, desktop and web applications. This technology assists stakeholders to easily understand various quality aspects of different parts/attributes/features/functionalities of the software applications at many levels of granularity. The application map can complement existing reporting and dashboard methods for presenting project quality information to stakeholders.

Figure 1:
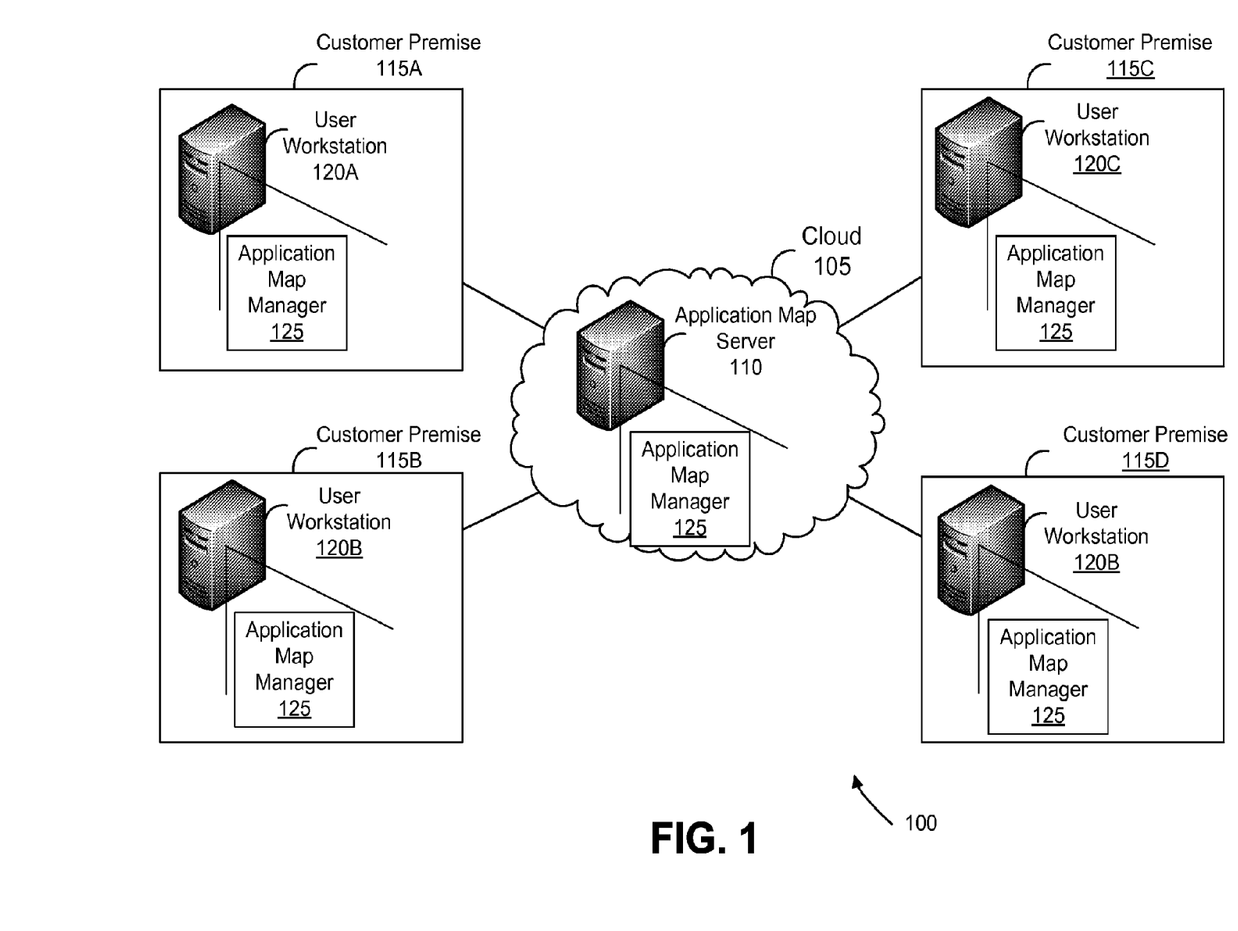
FIG. 1 is a block diagram that illustrates an embodiment of a system having an application map manager that processes the software application metadata associated with a software application.
Figure 2:
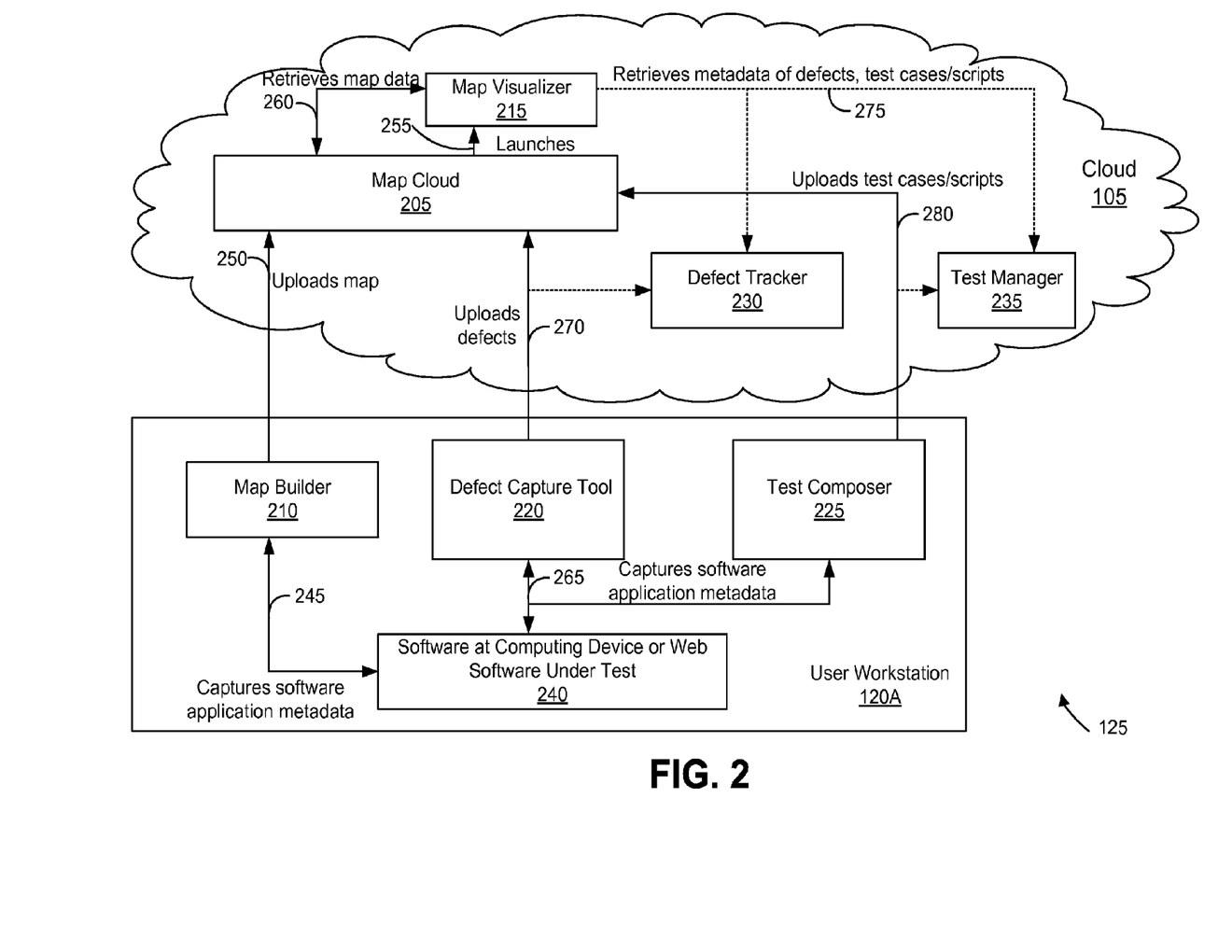
FIG. 2 is a high-level block diagram that illustrates an embodiment of an application map manager, such as that shown in FIG. 1.

FIG. 1 is a block diagram that illustrates an embodiment of a system 100 having an application map manager 125 that processes the software application metadata associated with a software application 240 (FIG. 2). The system 100 can include user workstations 120A-D at respective customer premises 115A-D. Each user workstation 120A-D is installed with an application map manager 125. The user workstation 120A-D can communication with an application map server 110 that is also installed with the application map manager 125 and is located in the "cloud" 105. The application map manager 125 provides an application map 600 (FIG. 6) that displays a map-like visualization of the software application 240 and aides software developers in navigating and analyzing the various software components of the software application 240. The application map manager 125 can be executed through the cloud 105 or at each workstation 120A-D. The application map manager 125 is further described in connection to FIGS. 2-8.

FIG. 2 is a high-level block diagram that illustrates an embodiment of an application map manager 125, such as that shown in FIG. 1. In this example, the application map manager 125 can include a map visualizer 215 at the application map server 110 (FIG. 1) located in the cloud 105 and a map builder 210, defect capture tool 220, and test composer 225 at a user workstation 120A (FIG. 1) located in the customer premise 115A (FIG. 1). Although the components of the application map manager 125 are shown to be at the application map server 110 and the user workstation 120A, one skilled in the art would appreciate that all of the components of the application map manager 125 can located at the workstation 120A or at the application map server 110.

The map builder 210 captures software application metadata at line 245 from a software application 240 at a computing device or a web-based software application 240 that is under testing. The map builder 210 uploads information associated with an application map 600 (FIG. 6) to a map cloud 205 at line 250. The map builder 210 is further described in connection to FIG. 4.

The defect capture tool 220 and the test composer 225 can also capture and process software application metadata associated with the software application 240 at line 265 for defects and information associated with test cases/scripts. The defect capture tool 220 and the test composer 225 upload the detected defects at line 270 and the information associated with test cases/scripts at line 280, respectively, to the map cloud 205.

The defect capture tool 220 can associate screen unique identifier 707 (FIG. 7) with defect information before uploading a defect to the map cloud 205 or a defect tracker 230. The test composer 225 can allow users to generate test cases and/or test scripts automatically and upload those test cases and scripts to the map cloud 205. Users can execute a test scenario on the software application 240 under test and have the tools generate execution steps in various formats such as text and programming scripts. The test composer 225 can also allow users to gather unique identifiers 707 of screens and sequence of steps covered by each test case/script during the test execution. When each test case/script is uploaded, associated screens can also be uploaded as metadata to either the map cloud 205 or a test manager 235.

The map cloud 205 is the centralized cloud-based web application providing a user interface for application map users and an application programming interface for other components of the application map manager 125. The map cloud 205 enables collaboration among users and serves as the integration point for other components of the application map manager 125. The map cloud 205 launches a map visualizer 215 at line 255, which retrieves the uploaded software application metadata from the map cloud 205 for generating the application map 600 (FIG. 6). The map visualizer 215 is further described in connection to FIG. 5.

A defect tracker 230 retrieves the software application metadata associated with the detected defects from either the defect capture tool 220 or the map visualizer 215 at lines 270, 275, respectively. The defect tracker 230 can track the number of defects, severity of defects, defects category, and assigned developers associated with the defects based on the collected software application metadata that is related to the defects. Although the defect tracker 230 is shown to be at the application map server 110 or in the cloud 105, one skilled in the art would appreciate that all defect tracker 230 can located at the workstation 120A in the customer premise 115A.

A test manager 235 retrieves the software application metadata associated with the information associated with the test cases/script from either the test composer 225 or the map visualizer 215 at lines 280, 275, respectively. The test manager 235 can be a $3^{rd}$-party test management system.

Figure 3:
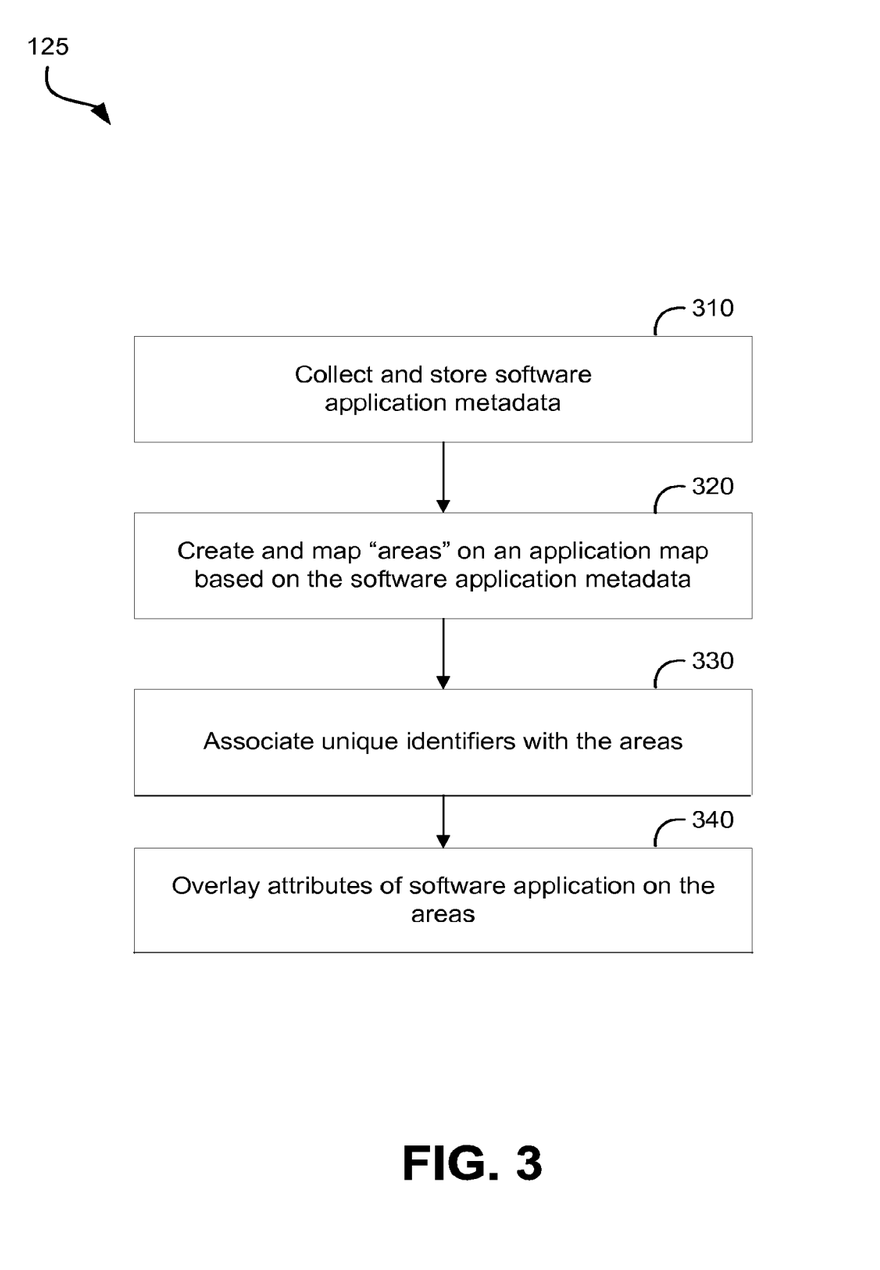
FIG. 3 is a high-level flow diagram that illustrates an embodiment of the architecture, functionality, and/or operation of an application map manager, such as that shown in FIG. 1.
Figure 8:
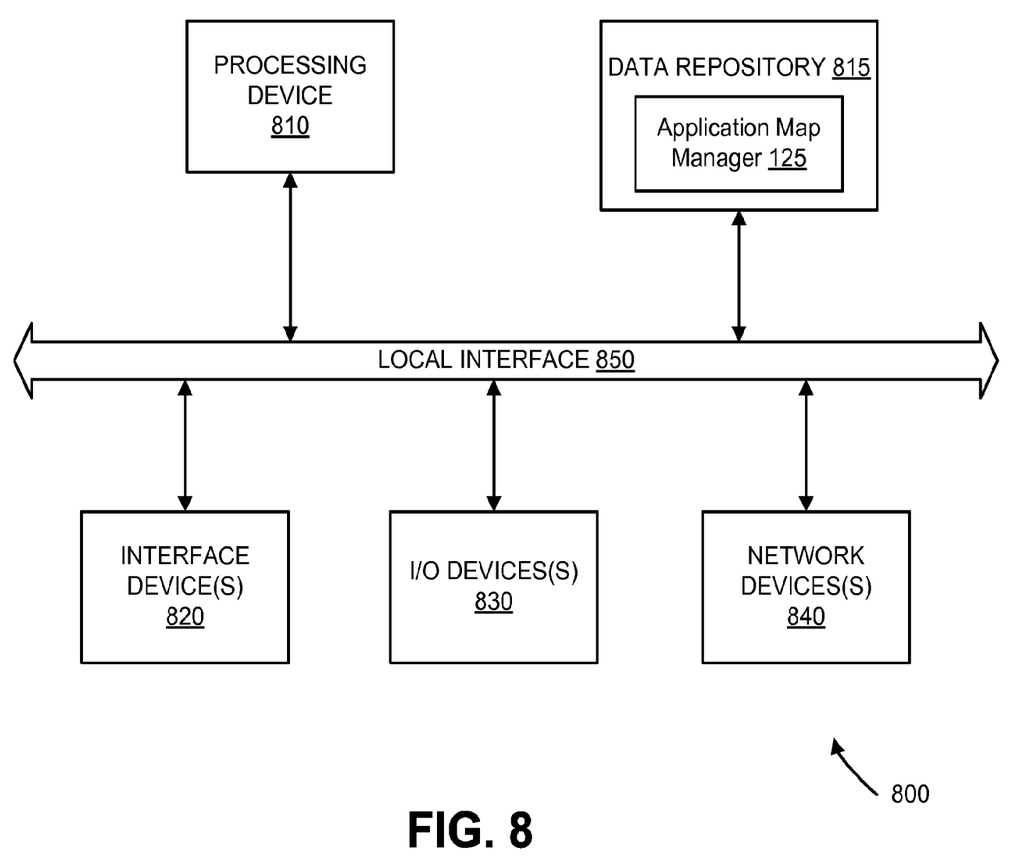
FIG. 8 is a block diagram illustrating an exemplary architecture for a generic computer that is similar to the architecture of the computing device, local server and central server, such as that shown in FIG. 1.

FIG. 3 is a high-level flow diagram that illustrates an embodiment of the architecture, functionality, and/or operation of an application map manager 125, such as that shown in FIG. 1. Beginning with block 310, the map builder 210 of the application map manager 125 collects software application metadata associated with a software application 240 (FIG. 2). The software application metadata includes a first set of information related at least one of the following: screens A, B, C (FIG. 6), paths 632, 637, 642 (FIG. 6), and layers 605, 610, 615 (FIG. 6) associated with the software application 240; and stores the software application metadata in a data repository 815 (FIG. 8).

At block 320, the map visualizer 215 of the application map manager 125 creates and maps "areas" 630, 635, 640 (FIG. 6) on an application map 600 (FIG. 6) based on software application metadata collected from the software application 240. At block 330, the application map manager 125 associates unique identifiers 707 (FIG. 7) with the respective "areas" 630, 635, 640 on the application map 240.

And at block 340, the map visualizer 215 overlays a second set of information of the software application metadata on top of the "areas" on the application map using the unique identifiers, respectively. The second set of information of the software application metadata is related to various attributes of the software application, such as, quality-related (or defect) information, application features, application field-level constraints, data entered into the application, frequency of access and entry into screens, paths, layers and fields, and version of the software application. The map visualizer 215 can allow project stakeholders to understand the user interface flow of their software application 240, test coverage and defect information.

Figure 4:
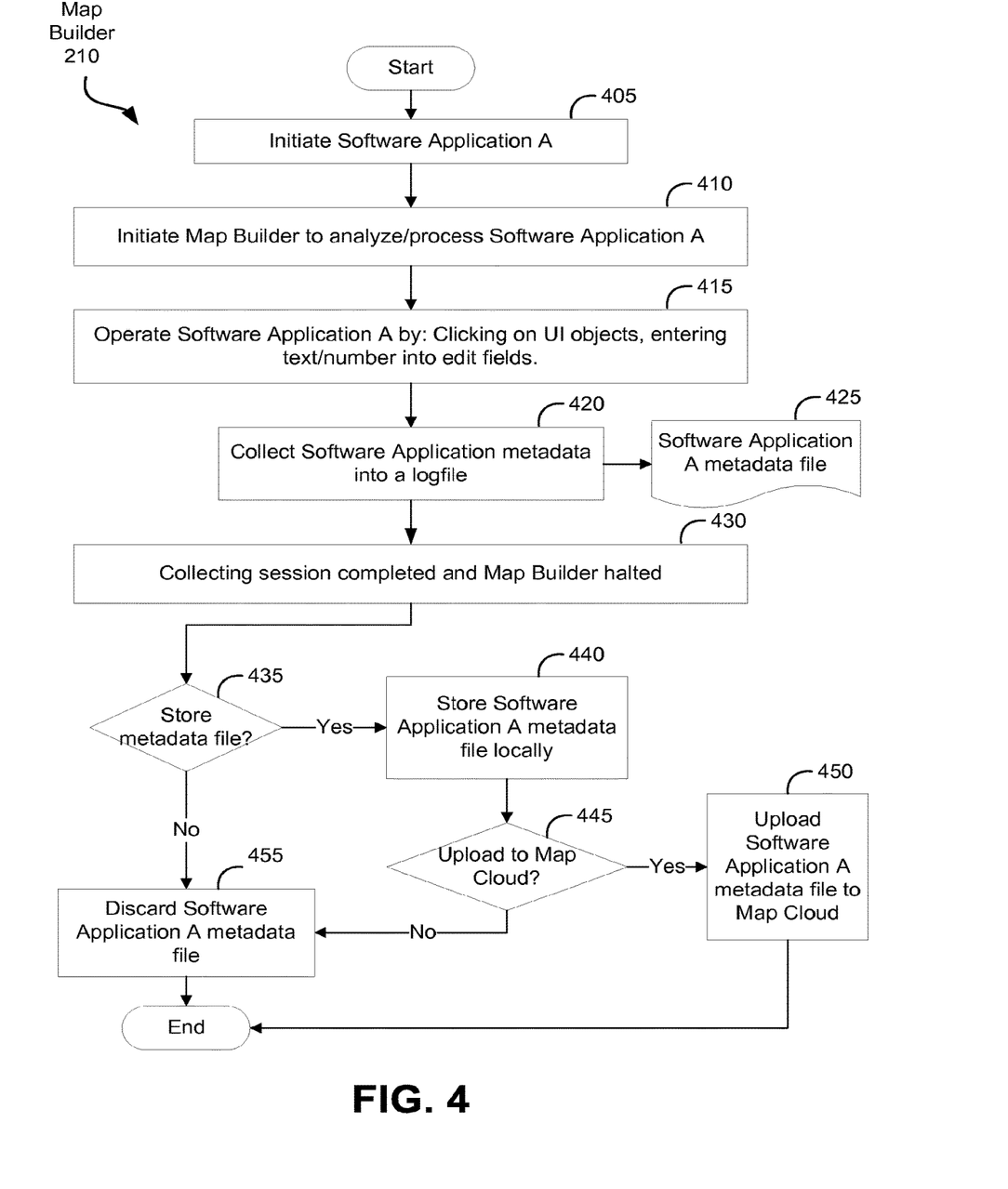
FIG. 4 is a flow diagram that illustrates an embodiment of the architecture, functionality, and/or operation of a map builder, such as that shown in FIG. 2.

FIG. 4 is a flow diagram that illustrates an embodiment of the architecture, functionality, and/or operation of a map builder 210, such as that shown in FIG. 2. Beginning with block 405, software application A is initiated or launched, and at block 410, map builder 210 is initiated to analyze/process software application A. At block 415, software application A is operated or used by clicking on user interface objects, entering text/number into edit fields, etc. At block 420, the map builder 210 collects software application metadata associated with software application A into a logfile, for example, and populate a metadata file associated with the collected software application metadata at block 425. The map builder 210 can collect the software application metadata related to at least one test execution conducted on the software application A to overlay the test execution information on top of the application map 600 (FIG. 6).

Additionally or alternatively, the map builder 210 can collect the software application metadata related to defects occurred during a test execution of the software application A to overlay the defect information on top of the application map 600. Additionally or alternatively, the map builder 210 can track the number of defects, severity of defects, defects category, and assigned developers associated with the defects based on the collected software application metadata that is related to the defects.

Additionally or alternatively, the map builder 210 can collect software application metadata by combining static analysis of the source and/or binary and dynamic execution of the software application. Additionally or alternatively, the map builder 210 can index the software application metadata such that the software application metadata is able to be searched and combined with a second set of information that are related to various attributes of the software application.

Additionally or alternatively, the map builder 210 can collect the software application metadata by automatically capturing whole or part of all screens and paths in the software application by way of the instructions that are executed by the processing device (e.g., automated crawler), and by the users manually capturing whole or part of all screens and paths in the software application by using the software application as the collecting is performed in the background, and by the users manually combining screens and paths captured with screens and paths captured automatically to populate the data repository of application screens, paths and layers.

At block 430, the process of collecting software application metadata is completed and the map builder 210 is halted. At block 435, the map builder 210 determines whether to store the software application metadata and/or the metadata file in a data repository 815 (FIG. 8). If "yes," the map builder 210 at block 440 stores the collected software application metadata and/or the metadata file associated with software application A at a local data repository (not shown). At block 445, the map builder 210 determines whether to upload the collected software application metadata and/or the metadata file to a map cloud 205 (FIG. 2). If "yes," the map builder 210 at block 450 uploads the collected software application metadata and/or the metadata file to a map cloud 205. If "no" is determined at blocks 435 and 445, the map builder 210 at block 455 can discard the collected software application metadata and/or the metadata file.

Figure 5:
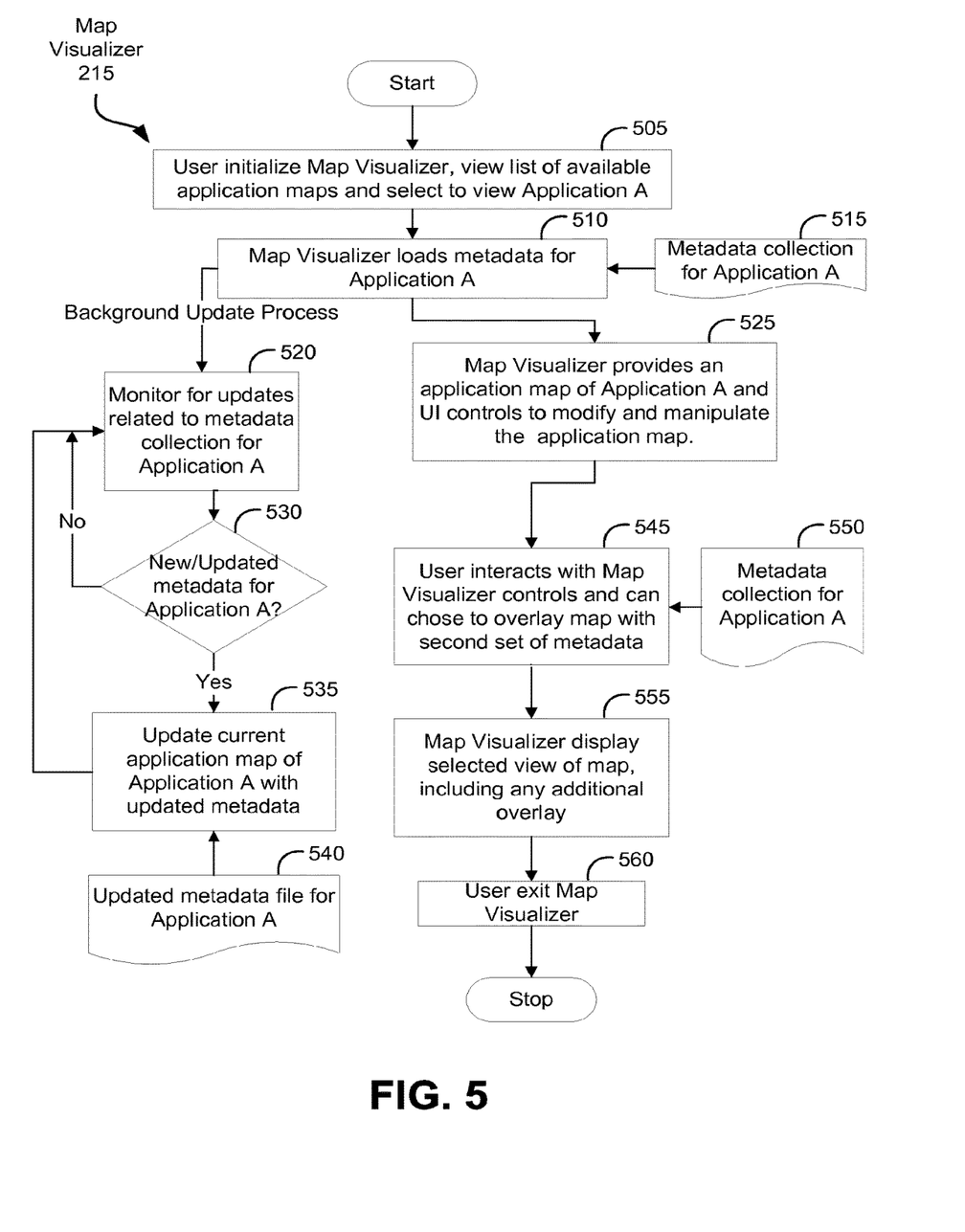
FIG. 5 is a flow diagram that illustrates an embodiment of the architecture, functionality, and/or operation of a map visualizer, such as that shown in FIG. 2.
Figure 6:
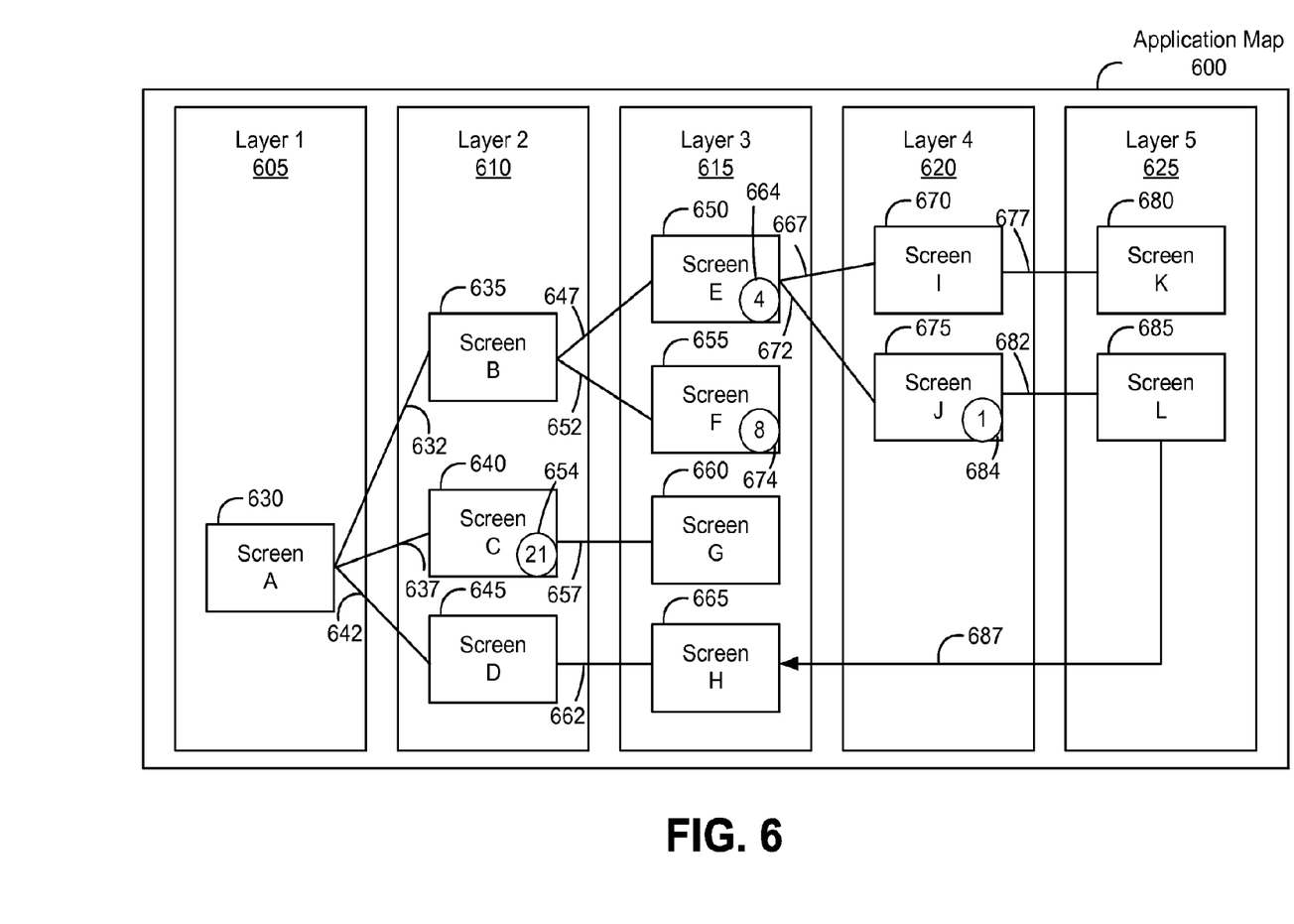
FIG. 6 is an embodiment of an application map that displays a map-like visualization of a software application and aides software developers in navigating and analyzing the various software components of the software application, such as that shown in FIG. 2.

FIG. 5 is a flow diagram that illustrates an embodiment of the architecture, functionality, and/or operation of a map visualizer 215, such as that shown in FIG. 2. Beginning with block 505, a user initializes or launches the map visualizer 215, views a list of available application maps, and select an application map 600 (FIG. 6) associated with software application A. At block 510, the map visualizer 215 loads the software application metadata for the software application A that was collected at block 515.

At block 525, the map visualizer 215 provides an application map 600 of the software application A based on the software application metadata and a user interface controls for users to modify and manipulate the application map 600. At block 545, the user can interact with the map visualizer 215 controls and can chose to overlay a second set of information of the software application metadata that is collected from the map builder 210, defect capture tool 220, or test composer 225, at block 550.

The map visualizer 215 can overlay the second set of information of the software application metadata on top of the "areas" on the application map by, for example, creating data layers 654, 702 (FIG. 7) that enable a user to zoom into and out of the application map 600 to access the various attributes 730 (FIG. 7) of the software application A. A top zoom-out position can be displayed to show the root screen (s) where the user can choose to zoom into a particular screen to see its children screens at a next area layer 605, 610, 615, 620, 625 (FIG. 6).

The map visualizer 215 at block 555 can display the application map 600, including the overlaid software application metadata. At block 560, the user exits the map visualizer 215. At block 520, the map visualizer 215 can monitor for new/updated software application metadata associated with the software application A. At block 530, the map visualizer 215 can determine whether the new/updated software application metadata is in fact associated with the software application A. If "no," the map visualizer 215 repeats the functionality at block 520. If "yes," the map visualizer 215 at block 535 updates the current application map associated with the software application A with the new/updated software application metadata. The map visualizer 215 can update the current application map with updated metadata file associated with the software application A, at block 540. The map visualizer 215 can automatically update the software application metadata collected in real-time. The map visualizer 215 repeats blocks 520, 530, 535 and 540.

FIG. 6 is an embodiment of an application map 600 that displays a map-like visualization of a software application 240 and aides software developers in navigating and analyzing the various software components of the software application 240, such as that shown in FIG. 2. The application map 600 includes areas 630, 635, 640, 645, 650, 660, 665, 670, 675, 680, 685 on the application map 600. In this example, the areas include respective screens A, B, C, D, E, F, G, H, I, J, K, L.

Area layers 605, 610, 615, 620, 625 group at least one area on the application map 600. For example, area layer 605 groups area 630; area layer 610 groups areas 635, 640, 645; area layer 615 groups areas 650, 655, 660, 665; area layer 620 groups areas 670, 675; and area layer 625 groups areas 680, 685. Paths 632, 637, 642, 647, 652, 657, 662, 667, 672, 677, 682, 687 link the areas 630, 635, 640, 645, 650, 660, 665, 670, 675, 680, 685 on the application map 600 to another area to show progression of the software application 240 from one area to another. For example, path 632 links areas 630, 635; path 637 links areas 630, 640; path 642 links areas 630, 645; path 647 links areas 635, 650; path 652 links areas 635, 655; path 657 links areas 640, 660; path 662 links areas 645, 665; path 667 links areas 650, 670; path 672 links areas 650, 675; path 677 links areas 670, 680; path 682 links areas 675, 685; and path 687 links areas 685, 665.

Data layers 654, 664, 674, 684 show information that are related to quality assurance of the features, functionalities, and attributes of the software application. In this example, defect counts 654, 664, 674, 684 are associated with screens C, E, F, J and the screen with a high defect number (screen C in this case) can be highlighted. Such information allows users to make better decisions to improve the software quality. The data layers are further described in connection to FIG. 7.

As a specific example, if the software application 240 to be analyzed is Microsoft Word™, then screen A may represent its Home screen (not shown), screen B its Insert screen (not shown), which is accessible from the Home screen, and screen F its SmartArt dialog (not shown), which is accessible from the Insert screen.

Depending on the application's unique characteristics and attributes, such as business logic, use of Ajax technology, UI frameworks and elements etc., the map builder 210 (FIG. 2) can automatically capture whole or part of all screens and paths in Microsoft Word™. For example, certain navigation path is enabled when specific data is entered or specific user accesses the screen. In addition, the map builder 210 can capture screens of applications developed using a certain UI framework or with custom UI elements. In such scenarios, end-users can manually drive the capturing process by executing Microsoft Word™ while having the map builder 210 running in the background. When this method is used, the map builder 210 also generates screen unique identifications 707 (FIG. 7), captures screenshot (not shown 0 and determines the area layer 605, 610, 615, 620, 625 for each screen.

The map builder 210 can combine screens and paths captured via this manual execution to those captured automatically to populate the data repository of application screens, paths and layers. When there are changes to the system, users can trigger any of these processes to update the package with new, deleted or modified screens and paths. The application map 600 can be updated automatically as the software application metadata is collected in real-time.

Figure 7:
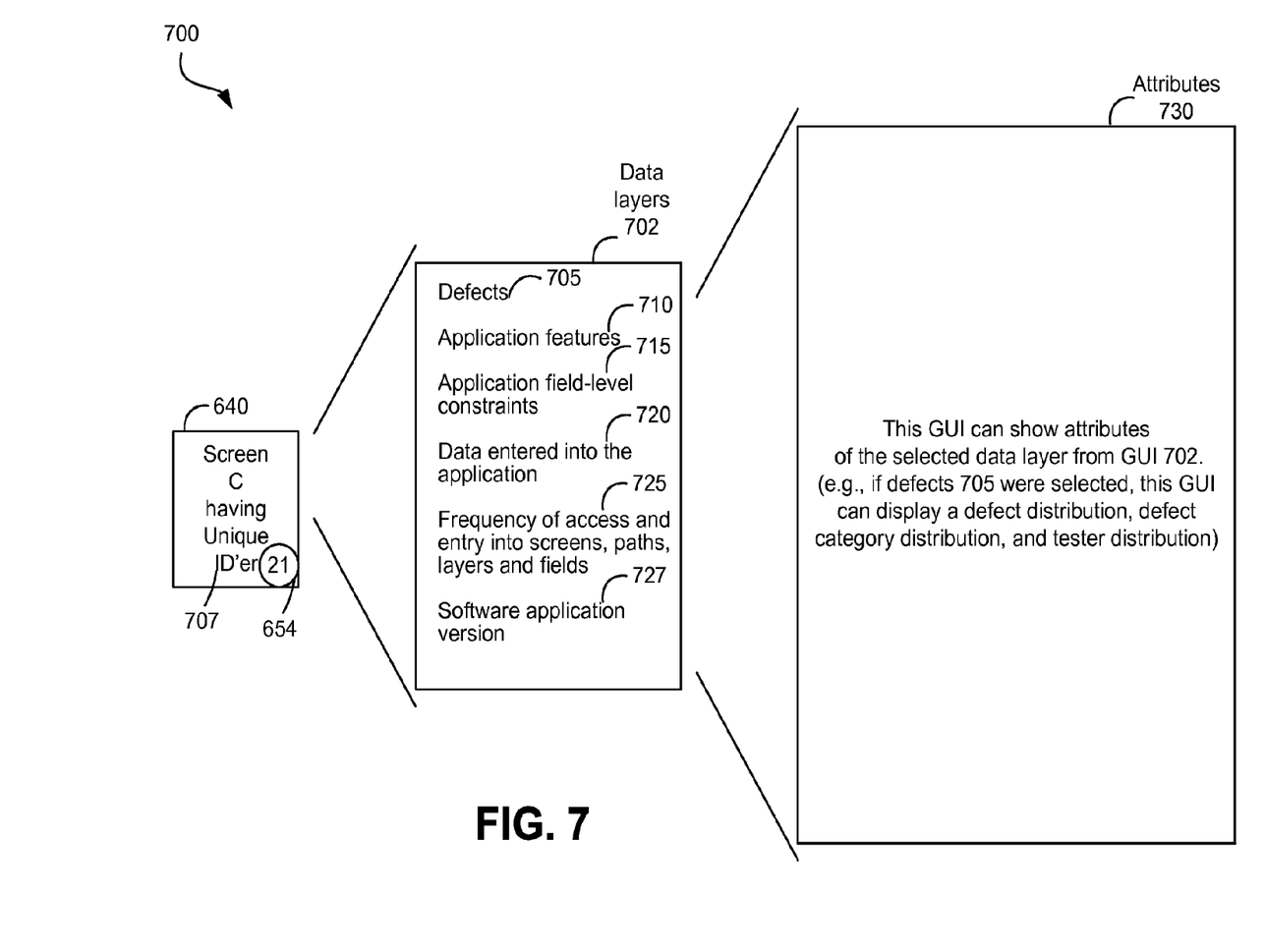
FIG. 7 is an expanded view that illustrates an embodiment of data layers and attributes that can be displayed in an application map, such as that shown in FIG. 6.

The map builder 210 can automatically capture information by combining static analysis of application's source and/or binary and dynamic execution of the application, including output HTML analysis in the case of web applications. Between every two screens, the map builder 210 can maintain one (1) or more paths, such as, path 632 from screens A to B and another path 632 from screen B to A regardless of the actual number of ways to navigate between A and B, which could be numerous, especially in the context of web applications. As the map builder 210 captures each screen, the map builder 210 can also assign a screen unique identification 707, a screenshot and an area layer 605, 610, 615, 620, 625. The root screen can be placed at area layer 1 (605) and its immediate children, i.e. those screens accessible from the root screen, having area layer 2 (610) and so on. If a screen is located at multiple area layers, such as, in the case where there are multiple paths to it from different screens, the shallowest area layer is assigned to that screen.

The map visualizer 215 can presents screens A, B, C, D, E, F, G, H, I, J, K, L, paths 632, 637, 642, 647, 652, 657, 662, 667, 672, 677, 682, 687 and area layers 605, 610, 615, 620, 625 in a map-like user interface. The map visualizer 215 allows users to zoom out and in of the application map 600, such as that shown in FIG. 7. The top zoom-out position shows the root screen(s) where users can choose to zoom into a particular screen to see its children screens at the next data layer 702 (FIG. 7). As zooming occurs, the map visualizer 215 can re-arrange screens and paths properly to best visualize them at the current area layer 605, 610, 615, 620, 625. The map visualizer 215 can allow users to search/filter screens, re-organize layers of screens and change paths among screens. The map visualizer 215 can visually reflect modification in real time as users make changes. In addition, the map visualizer 215 can allow users to view at least some or all screens and paths at any layer.

Besides displaying screens and paths, the map visualizer 215 overlays on top of the application map 600 various quality-related information that include, but are not limited to, test coverage information and defect information. Such information can be captured by the test composer 225 and the defect capturing tool 220.

FIG. 7 is an expanded view 700 that illustrates an embodiment of data layers 702 and attributes 730 that can be displayed in an application map 600, such as that shown in FIG. 6. In this example, area 640 (FIG. 6) can be zoomed in to show captured screen C, its data layers 654, 702, and its attributes 730. The map visualizer 215 can associate screen C at area 640 with a unique identifier 707 on the application map 600. The unique identifiers 707 can be a uniform resource locator (URL) or a generated number and/or code.

The map visualizer 215 overlays a second set of information of the software application metadata on or on top of area 640 of the application map 600 using the unique identifier 707. The second set of information of the software application metadata is related to various attributes 730 of the software application.

The overlaying of the second set of information of the software application metadata on or on top of area 640 of the application map 600 can be achieved by creating data layers 702 that enable a user to zoom into and out of the application map 600 to access the various attributes of the software application. Data layer 654 displays the defect count associated with screen C having a unique identifier 707.

A user can also access more information through data layers 702, which can be displayed on a graphical user interface (GUI) and show the second set of information of the software application metadata, which includes at least one of the following: quality-related (or defect) information 705, application features 710, application field-level constraints 715, data entered into the application 720, frequency of access and entry into screens, paths, layers and fields 725, and version of the software application 727.

Attributes 730 can be displayed on a graphical user interface (GUI) and shows the details of the attributes of the selected data layer from data layers 702. If defects 705 were selected at data layer 702, attributes 730 can display information related to defect distribution, defect category distribution, and tester distribution. Examples of other attributes 730 include, but are not limited to, displaying time-lapsed defect state changing activities over a period of time based on the software application metadata; displaying highlighted screens that were covered by test cases, enabling users to assess the current coverage ratio of at least one test suite; listing the screens from highest to lowest priority based on the results of test cases; and displaying defects trend over time based on number of defects, severity of defects, defects category, and assigned developers associated with the defects.

FIG. 8 is a block diagram illustrating an exemplary architecture for a generic computer 800 that is similar to the architecture of the computing device, local server and central server, such as that shown in FIG. 1. As indicated in FIG. 8, the computing generic computer 800 comprises a processing device 810, data repository 815, one or more user interface devices 820, one or more I/O devices 830, and one or more networking devices 840, each of which is connected to a local interface 850. The processing device 810 can include any custom made or commercially available processor, a central processing unit (CPU) or an auxiliary processor among several processors associated with the generic computer 800, a semiconductor based microprocessor (in the form of a microchip), or a macroprocessor. The data repository 815 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 820 comprise those components with which the user (e.g., administrator) can interact with the generic computer 800. Where the generic computer 800 comprises a server computer or similar device, these components can comprise those typically used in conjunction with a PC such as a keyboard and mouse.

The one or more I/O devices 830 comprise components used to facilitate connection of the generic computer 800 to other devices and therefore, for instance, comprise one or more serial, parallel, small system interface (SCSI), universal serial bus (USB), or IEEE 1394 (e.g., Firewire™) connection elements. The networking devices 840 comprise the various components used to transmit and/or receive data over networks 810, 815, where provided. By way of example, the networking devices 840 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The data repository 815 normally comprises various programs (in software and/or firmware) including an operating system (O/S) 825 and the application map manager 125, which has been described above. The O/S 825 controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. An application map including software executable instructions stored in a memory that is processed by a processing device and displays a map-like visualization of a software application and aides software developers in navigating and analyzing the various software components of the software application, the application map comprising:

areas on the application map that include screens, wherein the areas are mapped on an application map based on software application metadata collected from a software application;
area layers that group at least one area on the application map;
paths that link the areas on the application map to another area to show progression of the software application from one area to another; and
data layers that show information that are related to quality assurance of the features, functionalities, and attributes of the software application, wherein the data layers further show information that includes at least one of the following: quality-related (or defect) information, application features, application field-level constraints, data entered into the application, frequency of access and entry into screens, paths, layers and fields, and version of the software application, and wherein the data layers are overlaid on top of the areas on the application map.

2. The application map as defined in claim 1, wherein the application map is updated automatically as the software application metadata is collected in real-time.

3. The application map as defined in claim 1, wherein the data layers enable a user to zoom into and out of the application map to access the various attributes of the software application.

4. The application map as defined in claim 3, further comprising a top zoom-out position that shows the root screen(s) where the user can choose to zoom into a particular screen to see its children screens at a next area layer.

5. The application map as defined in claim 1, wherein the area layers are created based on the software application metadata collected from the software application.

6. The application map as defined in claim 1, wherein the paths are created based on the software application metadata collected from the software application.

7. An application map including software executable instructions stored in a memory that is processed by a processing device and displays a map-like visualization of a software application and aides software developers in navigating and analyzing the various software components of the software application, the application map comprising:
    areas on the application map that include screens;
    area layers that group at least one area on the application map;
    paths that link the areas on the application map to another area to show progression of the software application from one area to another;
    data layers that show information that are related to quality assurance of the features, functionalities, and attributes of the software application;
    screens that show time-lapsed defect state changing activities based on the software application metadata;
    highlighted screens that were covered by test cases, enabling users to assess the current coverage ratio of at least one test suite;
    screens that show from highest to lowest priority based on the results of test cases; and
    screens that show defects trend over time based on number of defects, severity of defects, defects category, and assigned developers associated with the defects.

8. The application map as defined in claim 7, wherein the data layers further show information that includes at least one of the following: quality-related (or defect) information, application features, application field-level constraints, data entered into the application, frequency of access and entry into screens, paths, layers and fields, and version of the software application.

9. The application map as defined in claim 7, wherein the data layers are overlaid on top of the areas on the application map.

10. The application map as defined in claim 7, wherein the application map is updated automatically as software application metadata is collected in real-time.

11. The application map as defined in claim 7, wherein the data layers enable a user to zoom into and out of the application map to access the various attributes of the software application.

12. The application map as defined in claim 11, further comprising a top zoom-out position that shows the root screen(s) where the user can choose to zoom into a particular screen to see its children screens at a next area layer.

13. The application map as defined in claim 7, wherein the area layers are created based on software application metadata collected from the software application.

14. The application map as defined in claim 7, wherein the paths are created based on software application metadata collected from the software.

* * * * *